US012689448B2

(12) United States Patent
Arai

(10) Patent No.: US 12,689,448 B2
(45) Date of Patent: Jul. 21, 2026

(54) POWER SOURCE CIRCUIT AND OCEAN-FLOOR OPTICAL CABLE

(71) Applicant: NEC Corporation, Tokyo (JP)

(72) Inventor: Narihiro Arai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 578 days.

(21) Appl. No.: 18/272,565

(22) PCT Filed: Jan. 7, 2022

(86) PCT No.: PCT/JP2022/000319
§ 371 (c)(1),
(2) Date: Jul. 14, 2023

(87) PCT Pub. No.: WO2022/158311
PCT Pub. Date: Jul. 28, 2022

(65) Prior Publication Data
US 2024/0072909 A1 Feb. 29, 2024

(30) Foreign Application Priority Data
Jan. 21, 2021 (JP) ................................. 2021-008076

(51) Int. Cl.
*H04B 10/80* (2013.01)
*H01S 3/091* (2006.01)
(Continued)

(52) U.S. Cl.
CPC ......... *H04B 10/808* (2013.01); *H01S 3/0912* (2013.01); *H01S 3/0941* (2013.01); *H02M 3/04* (2013.01)

(58) Field of Classification Search
CPC ... H04B 10/808; H01S 3/0941; H01S 3/0912; H02M 3/04
See application file for complete search history.

(56) References Cited

U.S. PATENT DOCUMENTS 5,371,667 A * 12/1994 Nakao ................... H02M 3/156
363/124
6,128,205 A * 10/2000 Bernd ................. H02M 1/4266
323/283
(Continued)

FOREIGN PATENT DOCUMENTS

JP S63-005630 A 1/1988
JP H07-154310 A 6/1995
(Continued)

OTHER PUBLICATIONS

JP Official Communication for JP Application No. 2022-576598, mailed on Jun. 11, 2024 with English Translation.
(Continued)

*Primary Examiner* — Rafael O De Leon Domenech
(74) *Attorney, Agent, or Firm* — Sughrue Mion, PLLC

(57) ABSTRACT

A power source circuit includes circuit elements each including: a current control circuit including a DC/DC converter that inputs a predetermined voltage and outputs a voltage adjusted based on a control signal, to a load operated by feeding a predetermined current, a voltage dividing resistor that generates a reference voltage according to a voltage output from the DC/DC converter, a current detecting resistor that generates a current detecting voltage according to a current fed to the load, and a feedback circuit that compares the reference voltage with the current detecting voltage and outputs the control signal, to the DC/DC converter; and one or more Zener diodes connected in parallel to the DC/DC converter at a terminal for inputting the predetermined voltage, wherein the circuit elements are connected in series, and a system current is supplied from an external power source to the circuit elements connected in series.

10 Claims, 3 Drawing Sheets

(51) Int. Cl.
　　 *H01S 3/0941* 　　　 (2006.01)
　　 *H02M 3/04* 　　　　 (2006.01)

(56) 　　　　　　 References Cited

U.S. PATENT DOCUMENTS

| | | | | |
|---|---|---|---|---|
| 8,144,111 | B2 * | 3/2012 | Kim .................. | H05B 45/3725 |
| | | | | 345/82 |
| 2009/0261748 | A1 * | 10/2009 | McKinney ......... | H05B 45/3725 |
| | | | | 315/307 |
| 2011/0148324 | A1 * | 6/2011 | Du ...................... | H05B 45/345 |
| | | | | 315/297 |
| 2011/0227497 | A1 * | 9/2011 | Hu ......................... | H05B 45/46 |
| | | | | 315/224 |
| 2019/0074690 | A1 * | 3/2019 | Arai .......................... | H02J 1/14 |
| 2019/0207520 | A1 * | 7/2019 | Imade .................. | H05B 45/395 |
| 2021/0376722 | A1 * | 12/2021 | Tochitani .............. | H02M 3/158 |

FOREIGN PATENT DOCUMENTS

| | | | |
|---|---|---|---|
| JP | 2000-278935 | A | 10/2000 |
| JP | 2014-171361 | A | 9/2014 |
| JP | 2019-103289 | A | 6/2019 |
| JP | 2019-160755 | A | 9/2019 |
| JP | 2020-078197 | A | 5/2020 |

OTHER PUBLICATIONS

International Search Report for PCT Application No. PCT/JP2022/
000319, mailed on Mar. 1, 2022.
English translation of Written opinion for PCT Application No.
PCT/JP2022/000319, mailed on Mar. 1, 2022.

* cited by examiner

POWER SOURCE CIRCUIT AND OCEAN-FLOOR OPTICAL CABLE

This application is a National Stage Entry of PCT/JP2022/000319 filed on Jan. 7, 2022, which claims priority from Japanese Patent Application 2021-008076 filed on Jan. 21, 2021, the contents of all of which are incorporated herein by reference, in their entirety.

TECHNICAL FIELD

The present invention relates to a power source circuit that supplies a predetermined current to each of a plurality of loads connected to one another in series via one power source line.

BACKGROUND ART

An ocean-floor cable system includes a terminal station device installed on a land, an ocean-floor device installed on an ocean floor, and a cable whose entire length reaches several thousands of kilometers in some cases. The ocean-floor cable system adopts a power supply method of supplying a constant current (hereinafter, referred to as a "system current") via a power source cable. Examples of the ocean-floor device constituting such an ocean-floor cable system include an ocean-floor repeater that amplifies an optical signal attenuated by transmission via an optical fiber and restores an original optical signal level.

As an information communication amount is globally increased, a capacity of the ocean-floor cable system is greatly increased. In order to achieve such data communication, the ocean-floor repeater is required to have a higher optical output. Further, as the capacity of the ocean-floor cable system is increased, a required number of ocean-floor repeaters tends to be greatly increased. However, power that can be supplied from a land station is limited, and hence an ocean-floor repeater with high power source efficiency is required.

PTL 1 describes an example of a technique for supplying a current to a plurality of ocean-floor repeaters connected to one another in series via a power source cable. In a case of a power source circuit of an ocean-floor optical repeater described in PTL 1, a direct current constant voltage appearing at both ends of each of Zener diodes inserted in series in the middle of a power supply line functions as a power source, and each of repeater circuits of the ocean-floor optical repeater, which are connected in parallel to each of the Zener diodes, is operated. In general, the ocean-floor optical repeater includes a laser module therein, and acquires an optical output by causing a predetermined current to be fed to the laser module by a laser module driving circuit.

A power source circuit for an ocean-floor optical repeater, which is referred to in the present invention, is explained.

A configuration of a power source circuit referred to in the present invention is explained. FIG. 3 is a circuit diagram illustrating an example of a configuration of the power source circuit referred to in the present invention. A system current is supplied from an external power source 300 to a power source circuit 109. The power source circuit 109 includes a current control circuit 159 and one or more Zener diodes 160. The one or more Zener diodes 160 are connected to one another in series. FIG. 3 illustrates one Zener diode 160, and the Zener diode 160 may include two or more Zener diodes in actuality. The current control circuit 159 includes a DC/DC converter 119, a voltage dividing resistor 120, a current detecting resistor 130, and a laser module driving circuit 149. The DC/DC converter 119 inputs a predetermined voltage $V_{in}$, and outputs a predetermined voltage $V_{out}$ to a laser module 209, the laser module driving circuit 149, and the current detecting resistor 130, which are connected in series. The voltage dividing resistor 120 generates a reference voltage $V_{ref}$ according to the voltage $V_{out}$ being output from the DC/DC converter 119. The current detecting resistor 130 generates a current detecting voltage $V_{mon}$ according to a current I fed to the laser module 209. The laser module driving circuit 149 adjusts the current I fed to the laser module 209 in such a way that the reference voltage $V_{ref}$ and the current detecting voltage $V_{mon}$ match with each other. The laser module driving circuit 149 includes an integrated circuit (IC) and a transistor. The Zener diode 160 is connected between terminals to which a system current is input.

An example of an operation of the power source circuit 109 is explained. In the following explanation, it is assumed that a conversion loss at the current control circuit 159 of the power source circuit 109 is negligible for easy understanding of the explanation. Further, it is assumed that only a system current of at most 1 A (ampere) is fed from a power supply device on a land (the external power source 300) to the ocean-floor cable. Further, it is assumed that a current of 1.2 A is consumed in the laser module 209. Further, it is assumed that the laser module 209 includes two laser diodes having an operation voltage of 2 V (volts). Further, it is assumed that the transistor of the laser module driving circuit 149 has a voltage drop of 2 V. Further, it is assumed that the current detecting resistor 130 has a voltage drop of 1 V. Specifically, consumed power of the DC/DC converter 119 on an output side is expressed as (2 V×2+2 V+1 V)×1.2 A=8.4 W (watts). In this case, a voltage required for the DC/DC converter 119 on an input side is expressed as 8.4 W/1 A=8.4 V. However, a type of a Zener voltage of a highly reliable Zener diode that can be used in the ocean-floor optical repeater is limited. For example, when a Zener voltage of the Zener diode is 7 V, two Zener diodes that are connected in series are used as the Zener diode 160 (a total Zener voltage is 14 V). In this case, consumed power of the DC/DC converter 119 on the input side is expressed as 14 V×1 A=14 W, and power efficiency of the DC/DC converter 119 between the input side and the output side is expressed as 8.4 W/14 W=60%.

PTL 2 describes an example of a technique for supplying a current at high power source efficiency. A power source device described in PTL 2 includes a direct current to direct current converter (DC/DC converter), a detecting resistor, an instruction voltage generating unit, a comparator, a power source unit, and a phase compensating unit. The comparator generates a high-level feedback voltage when a detecting voltage is larger than an instruction voltage, and generates a low-level feedback voltage when the detecting voltage is smaller than the instruction voltage. The DC/DC converter reduces a driving current for a light emitting diode when the feedback voltage is larger than an internal reference voltage, and increases the driving current when the feedback voltage is smaller than the reference voltage. As a result of the above-mentioned configuration, the power source device described in PTL 2 achieves modulation of light of the light emitting diode at high power source efficiency.

CITATION LIST

Patent Literature

PTL1: Japanese Unexamined Patent Application Publication No. S63-005630

PTL2: Japanese Unexamined Patent Application Publication No. 2019-103289

SUMMARY OF INVENTION

Technical Problem

The laser module 209 is connected in series to the laser module driving circuit 149 of the power source circuit 109 referred to in the present invention, and hence a current having magnitude equivalent to that of the laser module 209 (for example, 1.2 A described above) is fed thereto. As a result, a voltage drop (for example, 2 V described above) occurs in the transistor included in the laser module driving circuit 149. Thus, the power source circuit 109 has a problem that the power source efficiency is low due to the voltage drop occurring in the laser module driving circuit 149.

The problem of the power source circuit 109 is explained further in detail. When the voltage drop (for example, 2 V described above) does not occur in the laser module driving circuit 149, consumed power of the DC/DC converter 119 on the output side is expressed as (2 V×2+1 V)×1.2 A=6 W. In this case, a voltage required for the DC/DC converter 119 on the input side is expressed as 6 W/1 A=6 V. For example, when a Zener voltage of the Zener diode is 7 V, one Zener diode is used as the Zener diode 160. In this case, consumed power of the DC/DC converter 119 on the input side is expressed as 7 V×1 A=7 W, and power efficiency of the DC/DC converter 119 between the input side and the output side is expressed as 6 W/7 W=86%. Specifically, as compared to this example, in the above-mentioned example relating to the power source circuit 109, the power efficiency is reduced from 86% to 60% due to the voltage drop (for example, 2 V described above) in the laser module driving circuit 149, and a supplied voltage from the external power source 300 is increased from 7 V to 14 V. In this manner, the voltage drop in the laser module driving circuit 149 may cause significant reduction of the power efficiency of the power source circuit 109.

The power source device described in PTL 2 inputs a constant voltage. However, it is not considered that, when a system current (a constant current) is supplied to one power source line, the constant voltage is supplied to each of a plurality of power source devices that are connected to one another in series. Thus, in a case of the power source device described in PTL 2 as it is, when the constant current is supplied to one power source line, each of the plurality of power source devices that are connected to one another in series cannot be supplied with the constant voltage. Therefore, the power source device described in PTL 2 has a problem that it is difficult to supply a predetermined current to each of a plurality of loads when the constant current is supplied to one power source line. In general, it is also difficult to adopt a method of matching a current to be fed to each of the light emitting diodes that are subjected to current control by the plurality of power source devices with the constant current supplied to one power source line. The reason for this is that, for example, currents required for the light emitting diodes are generally not equivalent to one another (light emitting diodes with different outputs are mixed) and, moreover, input/output characteristics of each of the light emitting diodes are changed over time.

The present invention has been made in view of the above-mentioned problems, and a main object thereof is to supply a predetermined current to each of a plurality of loads at high power source efficiency in a case in which a constant current is supplied to one power source line.

Solution to Problem

According to one aspect of the present invention, a power source circuit includes a plurality of circuit elements including: a current control circuit including a DC/DC converter configured to input a predetermined voltage and output a voltage being adjusted based on a control signal for feedback control, to a load to be operated by feeding a predetermined current, a voltage dividing resistor configured to generate a reference voltage according to a voltage being output from the DC/DC converter, a current detecting resistor configured to generate a current detecting voltage according to a current being fed to the load, and a feedback circuit configured to compare the reference voltage and the current detecting voltage with each other and output the control signal indicating a comparison result, to the DC/DC converter; and one or more Zener diodes being connected in parallel to the DC/DC converter at a terminal for inputting the predetermined voltage, wherein a plurality of the circuit elements are connected to one another in series, and a system current is supplied from an external power source to a plurality of the circuit elements being connected to one another in series.

According to one aspect of the present invention, an ocean-floor optical cable includes a power source circuit, an optical fiber, a plurality of optical amplifiers being connected to one another in series, and being each configured to amplify an optical signal being propagated through the optical fiber on an input side and output the optical signal to the optical fiber on an output side, and a laser module being a load included in each of the plurality of optical amplifiers. The power source circuit includes a plurality of circuit elements including: a current control circuit including a DC/DC converter configured to input a predetermined voltage and output a voltage being adjusted based on a control signal for feedback control, to a load to be operated by feeding a predetermined current, a voltage dividing resistor configured to generate a reference voltage according to a voltage being output from the DC/DC converter, a current detecting resistor configured to generate a current detecting voltage according to a current being fed to the load, and a feedback circuit configured to compare the reference voltage and the current detecting voltage with each other and output the control signal indicating a comparison result, to the DC/DC converter; and one or more Zener diodes being connected in parallel to the DC/DC converter at a terminal for inputting the predetermined voltage, wherein a plurality of the circuit elements are connected to one another in series, and a system current is supplied from an external power source to a plurality of the circuit elements being connected to one another in series.

Advantageous Effects of Invention

The present invention exerts an effect that a predetermined current can be supplied to each of a plurality of loads at high power source efficiency in a case in which a constant current is supplied to one power source line.

EXAMPLE EMBODIMENT

With reference to the drawings, example embodiments of the present invention are explained in detail below. In all the drawings, identical constituent elements are denoted with the same reference symbols, and explanation is omitted as appropriate.

First Example Embodiment

A first example embodiment being a basic of example embodiments of the present invention is explained.

A configuration according to the present example embodiment is explained.

Figure 1:
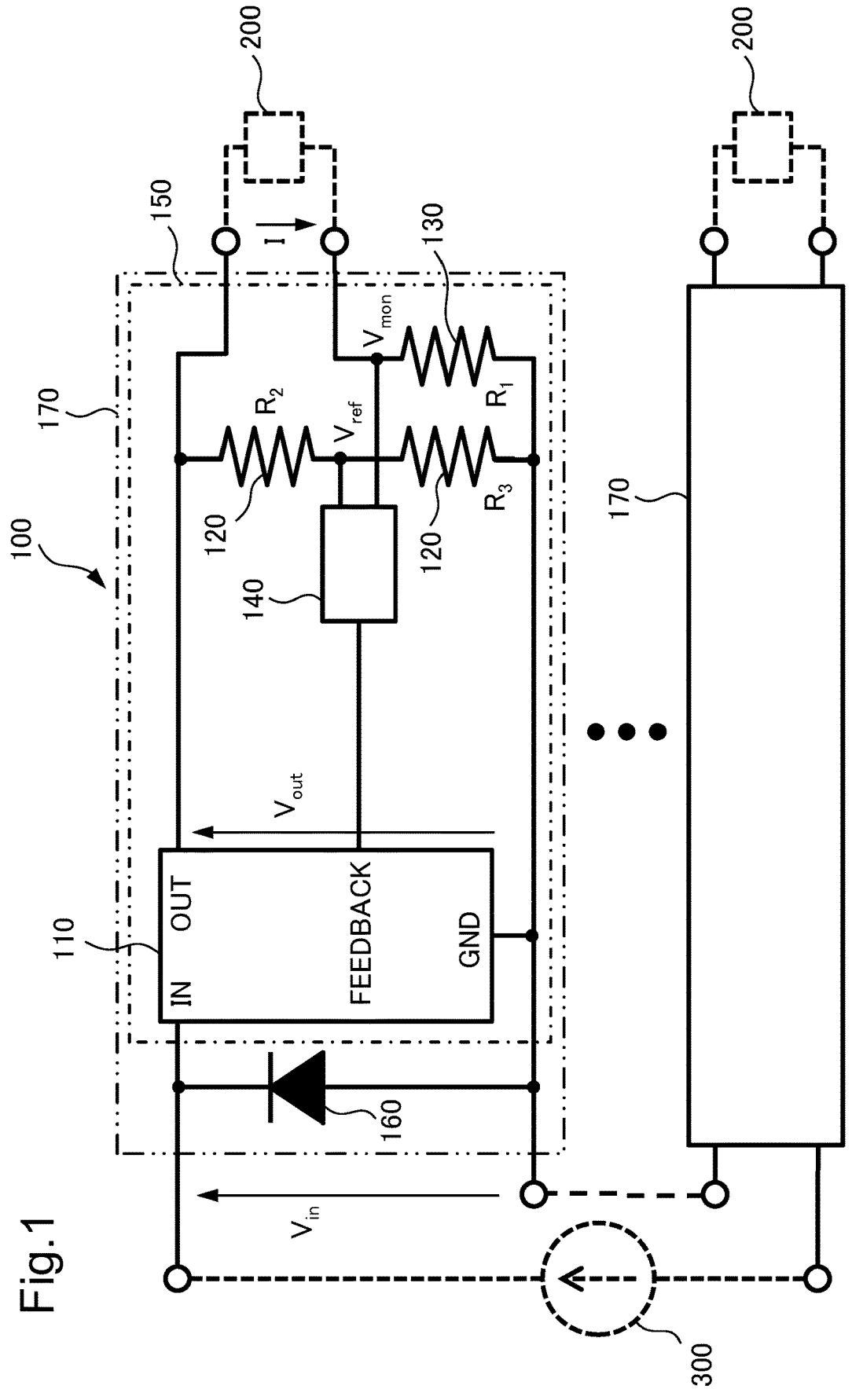
FIG. 1 is a circuit diagram illustrating an example of a configuration of a power source circuit according to a first example embodiment of the present invention.

FIG. 1 is a circuit diagram illustrating an example of a configuration of a power source circuit 100 according to the first example embodiment of the present invention.

The power source circuit 100 according to the present example embodiment includes a plurality of circuit elements 170. The plurality of circuit elements 170 are connected to each other in series. A system current is supplied from an external power source 300 to the plurality of circuit elements 170 that are connected to each other in series.

Each of the circuit elements 170 includes a current control circuit 150 and one or more Zener diodes 160.

The one or more Zener diodes 160 are connected to each other in series. FIG. 1 illustrates one Zener diode 160, and the Zener diode 160 may include two or more Zener diodes in actuality.

The current control circuit 150 includes a DC/DC converter 110, a voltage dividing resistor 120, a current detecting resistor 130, and a feedback circuit 140.

The DC/DC converter 110 inputs a predetermined voltage $V_{in}$, and outputs a voltage $V_{out}$ that is adjusted based on a control signal $S_{fb}$ for feedback control, to a load 200. Herein, it is assumed that the load 200 is a load that is operated by feeding a current within a predetermined voltage range (a range of a change rate of the voltage that is relatively narrower than a range of a change rate of the current) (hereinafter, referred to as a "current driven load"). Examples of the current driven load include a laser diode and a light emitting diode.

The voltage dividing resistor 120 generates a reference voltage $V_{ref}$ according to the voltage $V_{out}$ being output from the DC/DC converter 110.

The current detecting resistor 130 generates a current detecting voltage $V_{mon}$ according to the current being fed to the load 200.

The feedback circuit 140 compares the reference voltage $V_{ref}$ and the current detecting voltage $V_{mon}$ with each other, and outputs the control signal $S_{fb}$ indicating a comparison result, to the DC/DC converter 110. For example, the feedback circuit 140 is a comparator or an operational amplifier.

The Zener diode 160 is connected in parallel to the DC/DC converter 110 at a terminal for inputting the predetermined voltage $V_{in}$.

An operation according to the present example embodiment is explained.

The one or more Zener diodes 160 generate a predetermined voltage $V_{in}$ according to the system current supplied from the external power source 300.

The DC/DC converter 110 inputs the predetermined voltage $V_{in}$, and outputs the voltage $V_{out}$ that is adjusted based on the control signal $S_{fb}$ for feedback control, to the load 200.

The current detecting resistor 130 (a resistance value is indicated with $R_1$) generates a current detecting voltage $V_{mon}$ expressed as $I \times R_1$ according to a current I being fed to the load 200.

The voltage dividing resistor 120 (a resistance value is indicated with $R_2$ and $R_3$) generates a reference voltage $V_{ref}$ expressed as $V_{out} R_2/(R_2+R_3)$ according to the voltage $V_{out}$ being output from the DC/DC converter 110. Herein, it is assumed that the resistance values $R_2$ and $R_3$ of the voltage dividing resistor 120 are determined in advance in such a way that $I \times R_1 = V_{out} R_2/(R_2+R_3)$ is satisfied for the current I to be fed to the load 200.

Figure 2:
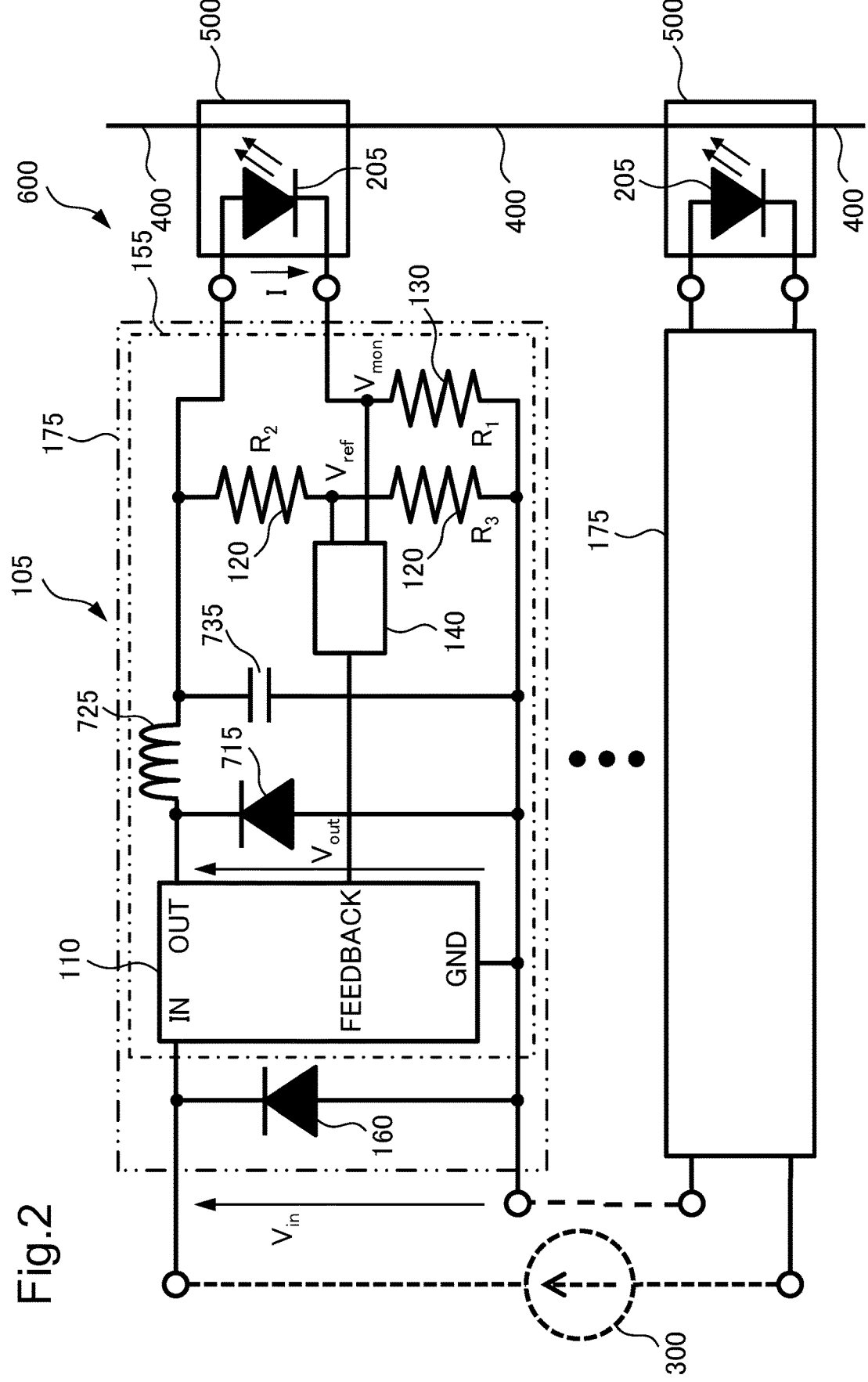
FIG. 2 is a circuit diagram illustrating an example of a configuration of a power source circuit according to a second example embodiment of the present invention.
Figure 3:
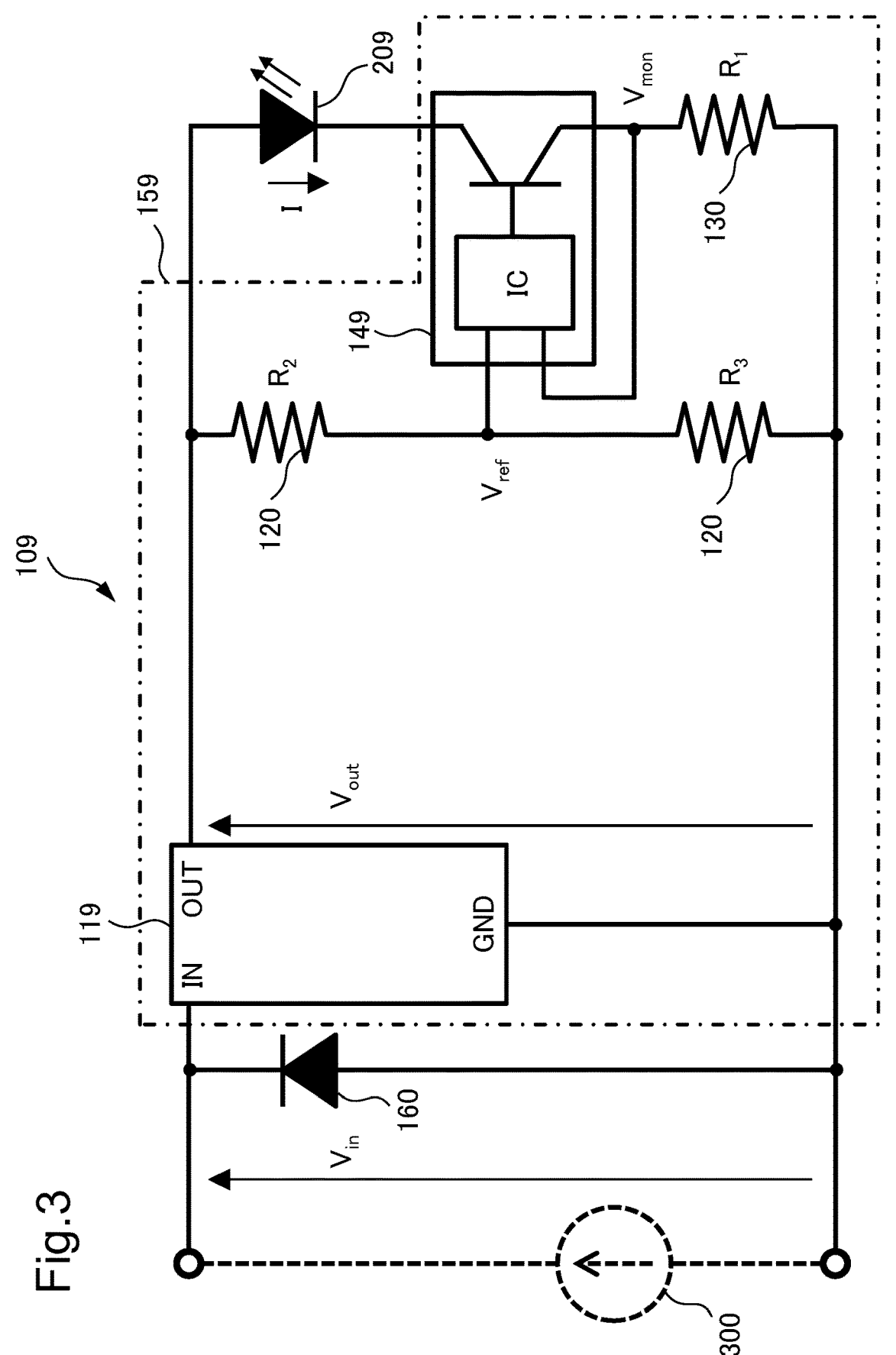
FIG. 3 is a circuit diagram illustrating an example of a configuration of a power source circuit referred to in the present invention.

The feedback circuit 140 compares the reference voltage $V_{ref}$ and the current detecting voltage $V_{mon}$ with each other, and outputs a control signal $S_{fb}$ according to the comparison result between the reference voltage $V_{ref}$ and the current detecting voltage $V_{mon}$, to the DC/DC converter 110 (a FEEDBACK terminal in the example of FIG. 2). Herein, the control signal $S_{fb}$ is a signal for increasing or reducing the voltage $V_{out}$ that is output from the DC/DC converter 110. In a case in which the control signal Sm is a digital signal, for example, the DC/DC converter 110 increases the voltage $V_{out}$ by a predetermined amount (a minute amount) when the control signal $S_{fb}$ is "−1", and reduces the voltage $V_{out}$ by a predetermined amount (a minute amount) when the control signal $S_{fb}$ is "1". In a case in which the control signal $S_{fb}$ is an analog signal, for example, the DC/DC converter 110 increases the voltage $V_{out}$ by a minute amount according to an absolute value of a negative value when the control signal $S_{fb}$ is the negative value, and reduces the voltage $V_{out}$ by a minute amount according to an absolute value of a positive value when the control signal $S_{fb}$ is the positive value.

The DC/DC converter 110 outputs, to the load 200, the voltage $V_{out}$ adjusted according to the input control signal $S_f$ in such a way that the reference voltage $V_{ref}$ and the current detecting voltage $V_{mon}$ match with each other. Herein, the current I to be fed to the load 200 is determined at a time of designing, and hence a value of the current detecting voltage $V_{mon}$, which is expected at a time of operating the load 200, is also determined at the time of designing. Further, the value of the voltage $V_{out}$ being output from the DC/DC converter 110, which is expected at the time of operating the load 200, is determined at the time of designing, according to the current I to be fed to the load 200 and the current detecting resistor 130. Further, the value of the reference voltage $V_{ref}$, which is expected at the time of operating the load 200, is determined at the time of designing, according to the value of the voltage $V_{out}$, which is expected at the time of operating the load 200. Further, the load 200 is a current driven load, and thus a change rate of the current I changes relatively largely as compared to a change rate of the voltage $V_{out}$.

As described above, in the power source circuit 100 of the present example embodiment, the system current is supplied from the external power source 300 to each of the circuit elements 170. Further, the Zener diode 160 included in each of the circuit elements 170 supplies the predetermined voltage $V_{in}$ to the DC/DC converter 110 included in each of the circuit elements 170. The DC/DC converter 110 outputs, to the load 200, the voltage $V_{out}$ adjusted in such a way that the reference voltage $V_{ref}$ and the current detecting voltage $V_{mon}$ are equivalent to each other. Herein, as for the current I to be fed to the load 200, the current detecting voltage $V_{mon}$ is expressed as $I \times R_1$, and the reference voltage $V_{ref}$ is expressed as $V_{out} R_2/(R_2+R_3)$. Power loss at the current control circuit 150 can be reduced as required by sufficiently reducing the resistance value $R_1$ as compared to an internal resistance of the load 200 and sufficiently increasing the resistance value $R_2+R_3$ as compared to the internal resistance of the load 200. Specifically, the laser module driving circuit 149 in the power source circuit 109 referred to in the present invention is not required, and the voltage drop at the laser module driving circuit 149 does not occur. Therefore, the power source circuit 100 of the present example embodiment exerts an effect that a predetermined current can be supplied to each of a plurality of loads at high power source efficiency in a case in which a constant current is supplied to one power source line.

In the power source circuit 100 of the present example embodiment, the DC/DC converter 110 may output the voltage $V_{out}$ that is acquired by constantly boosting the predetermined voltage $V_{in}$ while inputting the predetermined voltage $V_{in}$. In this case, the power source circuit 100 of the present example embodiment can exert an effect of suppressing a voltage required for supplying the system current.

The effect exerted in the present example embodiment is explained further in detail in comparison with the example in the explanation of the power source circuit 109 referred to in the present invention (using the numerical value examples). In the power source circuit 100 of the present example embodiment, the voltage drop due to the feedback circuit 140 does not occur, and hence consumed power of the DC/DC converter 110 on the output side is expressed as $(2 V \times 2+1 V) \times 1.2 A=6 W$. In this case, the voltage required for the DC/DC converter 110 on the input side is expressed as $6 W/1 A=6 V$. For example, when a Zener voltage of the Zener diode is 7 V, one Zener diode is used as the Zener diode 160. In this case, consumed power of the DC/DC converter 110 on the input side is expressed as $7 V \times 1 A=7 W$, and the power efficiency of the DC/DC converter 110 between the input side and the output side is expressed as $6 W/7 W=86\%$. Specifically, as compared to the example in the explanation of the power source circuit 109 given above, the power efficiency is increased from 60% to 86%, and the supplied voltage from the external power source 300 is reduced from 14 V to 7 V because there is no voltage drop (for example, 2 V described above) at the feedback circuit 140. In this manner, in the power source circuit 100 of the present example embodiment, the power efficiency at the power source circuit 100 can be increased largely, and the supplied voltage from the external power source 300 can be reduced largely, as compared to the power source circuit 109 referred to in the present invention. For example, in general, the ocean-floor repeaters are installed at an interval from 60 km (kilometers) to 80 km, in accordance with attenuation characteristics of an optical signal to be transmitted. In a case in which the total length of the ocean-floor cable is 12,000 km, when the interval is 60 km, approximately 200 repeaters are required. In this case, the supplied voltage from the external power source 300 (the power supply device on the land) described above can be suppressed from $200 \times 14 V=2,800 V$ to $200 \times 7 V=1,400 V$. Thus, an ocean-floor cable system that is inexpensive and has high safety can be established.

Further, the power source circuit 100 of the present example embodiment may include a Schottky diode 715

(Schottky barrier diode), a coil 725, a capacitor 735, and the like, which are for stabilizing the voltage $V_{out}$ being output from the DC/DC converter 110 (see FIG. 2 to be described later). Herein, for example, the Schottky diode 715 is connected to a positive electrode terminal OUT and a negative electrode terminal GND of the DC/DC converter 110 for outputting the voltage $V_{out}$. Further, the coil 725 is connected between the positive electrode terminal OUT and a positive-side end of the load 200. Further, the capacitor 735 is connected between the positive-side end and the negative electrode terminal GND. In this case, the power source circuit 100 of the present example embodiment can exert an effect of stabilizing the voltage $V_{out}$ that is output from the DC/DC converter 110.

Further, the power source circuit 100 of the present example embodiment may be included in an ocean-floor optical cable 600 (see FIG. 2 to be described later). Herein, for example, the ocean-floor optical cable 600 includes an optical fiber 400, a plurality of optical amplifiers 500, a laser module 205 being the load 200, which is included in each of the optical amplifiers 500, and a plurality of power source circuits 105. Herein, the plurality of optical amplifiers 500 are connected to each other in series. Further, each of the optical amplifiers 500 amplifies an optical signal that is propagated from the optical fiber 400 on the input side, and outputs the optical signal to the optical fiber 400 on the output side.

Second Example Embodiment

A second example embodiment of the present invention, which is based on the first example embodiment of the present invention, is explained. A power source circuit according to the present example embodiment is a power source circuit that drives a laser module included in an optical amplifier of an ocean-floor optical cable.

A configuration according to the present example embodiment is explained.

FIG. 2 is a circuit diagram illustrating an example of a configuration of the power source circuit according to the second example embodiment of the present invention. Further, in FIG. 2, an ocean-floor optical cable including an optical amplifier including a laser module is schematically illustrated.

An ocean-floor optical cable 600 of the present example embodiment includes an optical fiber 400, a plurality of optical amplifiers 500, a laser module 205 being a load, which is included in each of the optical amplifiers 500, and a plurality of power source circuits 105.

The plurality of optical amplifiers 500 are connected to each other in series. Each of the optical amplifiers 500 amplifies an optical signal that is propagated from the optical fiber 400 on the input side, and outputs the optical signal to the optical fiber 400 on the output side.

The laser module 205 is a current driven load. In actuality, the laser module 205 may include two or more laser modules (laser diodes). In such a case, the laser modules 205 are connected to each other in series. FIG. 2 illustrates an example in which one laser module 205 is one laser diode.

The power source circuit 105 includes a plurality of circuit elements 175.

The plurality of circuit elements 175 are connected to each other in series. A system current is supplied from an external power source 300 to the plurality of circuit elements 175 that are connected to each other in series. Each of the circuit elements 175 includes a current control circuit 155 and one or more Zener diodes 160.

The one or more Zener diodes 160 are connected to each other in series. FIG. 2 illustrates one Zener diode 160, and the Zener diode 160 may include two or more Zener diodes in actuality.

The current control circuit 155 includes a DC/DC converter 110, a Schottky diode 715 (Schottky barrier diode), a coil 725, a capacitor 735, a voltage dividing resistor 120, a current detecting resistor 130, and a feedback circuit 140.

The Zener diode 160 is connected to a power supply line to which the system current is supplied from a power supply device installed on the land (the external power source 300) in such a way that a direction from an anode to a cathode and a direction of the system current are opposite to each other. Hereinafter, a connection established in such a way that the direction from the anode to the cathode and the direction of the current supplied from the outside are opposite to each other is referred to as a "reverse connection", and a connection established in such a way that the direction from the anode to the cathode and the direction of the current supplied from the outside match with each other is referred to as a "forward connection".

An input side of the DC/DC converter 110 (an input terminal (IN terminal) and a ground terminal (GND terminal)) is connected in parallel to the Zener diode 160.

An output side of the DC/DC converter 110 (an output terminal (OUT terminal) and the GND terminal) is connected in parallel to the laser module 205 that is connected in series to the Schottky diode 715, and the capacitor 735, the voltage dividing resistor 120, and the current detecting resistor 130 that are connected in series to the coil 725. Herein, the Schottky diode 715 is reversely connected, and the laser module 205 is forwardly connected.

The DC/DC converter 110 inputs a breakdown voltage $V_{in}$ that is generated at both ends of the Zener diode 160 due to the system current from the power supply device, and outputs a voltage $V_{out}$ required for driving the laser module 205.

The Schottky diode 715, the capacitor 735, and the coil 725 stabilize the voltage $V_{out}$ being output from the DC/DC converter 110.

The feedback circuit 140 inputs a voltage at a point that connects a cathode side of the laser module 205 and the current detecting resistor 130 to each other, as a current detecting voltage $V_{mon}$. Further, as a reference voltage $V_{ref}$, the feedback circuit 140 inputs a voltage acquired by dividing the voltage $V_{out}$, which is output from the DC/DC converter 110, by the voltage dividing resistor 120. Further, the feedback circuit 140 outputs a signal according to a difference between the reference voltage $V_{ref}$ and the current detecting voltage $V_{mon}$, as a control signal $S_{fb}$ to a FEEDBACK terminal of the DC/DC converter 110.

An operation according to the present example embodiment is explained.

The power supply device installed on the land (the external power source 300) supplies a current having a constant value (the system current) to an ocean-floor device (for example, the optical amplifier 500) via a power supply line (the power source cable). A positive voltage is applied to the cathode side of the Zener diode 160 that is connected in parallel to the ocean-floor device (for example, the optical amplifier 500), and a negative voltage is applied to the anode side of the Zener diode 160. When the voltage is applied between the cathode and the anode of the Zener diode 160, the voltage between the cathode and the anode is maintained constant by the breakdown voltage due to the Zener effect when the system current is fed. The voltage generated by the Zener diode 160 is referred to as a primary-side voltage $V_{in}$, and the voltage being output from the DC/DC converter 110 is referred to as a secondary-side voltage $V_{out}$. The DC/DC converter 110 outputs the voltage required for driving the laser module 205, as a secondary-side voltage $V_{out}$. When the ocean-floor device is an ocean-floor repeater, the DC/DC converter 110 of the current control circuit 155 included in the ocean-floor device outputs the voltage $V_{out}$ for feeding a constant current to the laser module 205. The current detecting resistor 130 converts the current I fed to the laser module 205, into the current detecting voltage $V_{mon}$. The feedback circuit 140 outputs the control signal $S_{fb}$ according to the difference between the current detecting voltage $V_{mon}$ and the reference voltage $V_{ref}$, to the FEEDBACK terminal of the DC/DC converter 110. The DC/DC converter 110 executes feedback control in such a way that the voltage $V_{out}$ is an expected voltage. Herein, the expected voltage is an output voltage of the DC/DC converter 110 when a desired constant current is fed to the laser module 205. It is assumed that the reference voltage $V_{ref}$ is determined in such a way that the current detecting voltage $V_{mon}$ matches with the reference voltage $V_{ref}$ when the output voltage of the DC/DC converter 110 matches with the expected voltage. Since the laser module 205 is a current driven load, the current I needs to be controlled because an optical output tends to be unstable in a case of voltage control. Further, the current I needs to be controlled in order to deal with degradation of characteristics of the laser module 205 over time.

Effects according to the present example embodiment are explained.

A first effect is that the voltage $V_{out}$ required for driving the laser module 205 can be suppressed to the voltage drop amount at the laser module 205 in a forward direction, except for the voltage drop amount at the current detecting resistor 130. Herein, the current detecting resistor 130 can be set to a sufficiently small resistance value, as compared to the internal resistance associated with the voltage drop at the laser module 205 in the forward direction.

This effect can be exerted because a feedback loop (the OUT terminal—the laser module 205—the current detecting resistor 130—the feedback circuit 140—the FEEDBACK terminal) for controlling the output voltage of the DC/DC converter 110 also functions as a feedback loop for controlling the current of the driving circuit of the laser module 205 to be constant. With this, the laser module driving circuit 149 of the power source circuit 109 referred to in the present invention is not required, and the voltage drop at the laser module driving circuit 149 does not occur. Further, the voltage $V_{out}$ required for driving the laser module 205 can be suppressed, and thus the voltage $V_{in}$ can be suppressed.

The second effect is that the consumed power of the ocean-floor repeater (the optical amplifier 500) can be suppressed.

This effect can be exerted because the voltage $V_{out}$ required for driving the laser module 205 can be suppressed to the voltage drop amount at the laser module 205 in the forward direction, except for the voltage drop amount at the current detecting resistor 130. Specifically, the laser module driving circuit 149 connected in series to the laser module 209 in the power source circuit 109 referred to in the present invention is not required, and the voltage drop at the laser module driving circuit 149 does not occur. Further, as explained in the first example embodiment, the loss at the current detecting resistor 130 and the voltage dividing resistor 120 can be reduced as required. With this, the consumed power required for driving the laser module 205 can be suppressed. As a result, for example, a larger number of ocean-floor repeaters can be accommodated in the one ocean-floor optical cable 600, and thus increase in the capacity of the ocean-floor optical cable 600 can be achieved.

Therefore, the power source circuit 105 of the present example embodiment exerts an effect that a predetermined current can be supplied to each of a plurality of loads at high power source efficiency in a case in which a constant current is supplied to one power source line. The present effect is remarkably exerted at the purpose of supplying power to an ocean-floor repeater that is installed on an ocean floor where power supply is difficult.

The effect exerted in the present example embodiment is explained further in detail in comparison with the example in the explanation of the power source circuit 109 referred to in the present invention (using the numerical value examples). In the power source circuit 105 of the present example embodiment, the voltage drop due to the feedback circuit 140 does not occur, and hence consumed power of the DC/DC converter 110 in the output side is expressed as (2 V×2+1 V)×1.2 A=6 W. In this case, the voltage required for the DC/DC converter 110 on the input side is expressed as 6 W/1 A=6 V. For example, when a Zener voltage of the Zener diode is 7 V, one Zener diode is used as the Zener diode 160. In this case, consumed power of the DC/DC converter 110 on the input side is expressed as 7 V×1 A=7 W, and the power efficiency of the DC/DC converter 110 between the input side and the output side is expressed as 6 W/7 W=86%. Specifically, as compared to the example in the explanation of the power source circuit 109 given above, the power efficiency is increased from 60% to 86%, and the supplied voltage from the external power source 300 is reduced from 14 V to 7 V because there is no voltage drop (for example, 2 V described above) at the feedback circuit 140. In this manner, in the power source circuit 105 of the present example embodiment, the power efficiency at the power source circuit 105 can be increased largely, and the supplied voltage from the external power source 300 can be reduced largely, as compared to the power source circuit 109 referred to in the present invention.

Further, in the power source circuit 105 of the present example embodiment, the Schottky diode 715, the capacitor 735, and the coil 725 stabilize the voltage $V_{out}$ being output from the DC/DC converter 110. Therefore, the power source circuit 105 of the present example embodiment exerts an effect of stabilizing the voltage $V_{out}$ required for driving the laser module 205.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2021-008076, filed on Jan. 21, 2021, the disclosure of which is incorporated herein in its entirety by reference.

INDUSTRIAL APPLICABILITY

The present invention is applicable to a purpose for supplying power to a current driven type device that is installed in a location where power supply is difficult, such as an ocean floor, a lake floor, a mountain, a high ground, an underground space, and a tunnel space.

REFERENCE SIGNS LIST

100, 105, 109 Power source circuit
110, 119 DC/DC converter
120 Voltage dividing resistor
130 Current detecting resistor
140 Feedback circuit
149 Laser module driving circuit
150, 155, 159 Current control circuit
160 Zener diode
170, 175 Circuit element
200 Load
205, 209 Laser module
300 External power source
400 Optical fiber
500 Optical amplifier
600 Ocean-floor optical cable
715 Schottky diode
725 Coil
735 Capacitor

What is claimed is:

1. A power source circuit comprising a plurality of circuit elements each including:

a current control circuit including a DC/DC converter configured to input a predetermined voltage and output a voltage being adjusted based on a control signal for feedback control, to a load to be operated by feeding a predetermined current, a voltage dividing resistor configured to generate a reference voltage according to a voltage being output from the DC/DC converter, a current detecting resistor configured to generate a current detecting voltage according to a current being fed to the load, and a feedback circuit configured to compare the reference voltage and the current detecting voltage with each other and output the control signal indicating a comparison result, to the DC/DC converter; and one or more Zener diodes being connected in parallel to the DC/DC converter at a terminal for inputting the predetermined voltage, wherein a plurality of the circuit elements are connected to one another in series, and a system current is supplied from an external power source to a plurality of the circuit elements being connected to one another in series.

2. The power source circuit according to claim 1, wherein the DC/DC converter outputs a voltage acquired by constantly boosting the predetermined voltage while inputting the predetermined voltage.

3. The power source circuit according to claim 1, wherein the feedback circuit is a comparator configured to compare the reference voltage and the current detecting voltage with each other and output, to the DC/DC converter, the control signal indicating a comparison result.

4. The power source circuit according to claim 1, wherein the feedback circuit is an operational amplifier configured to compare the reference voltage and the current detecting voltage with each other and output, to the DC/DC converter, the control signal indicating a comparison result.

5. The power source circuit according to claim 1, further comprising a Schottky diode, a coil, and a capacitor that are used for stabilizing a voltage being output from the DC/DC converter, wherein the Schottky diode is connected to a positive electrode terminal and a negative electrode terminal of the DC/DC converter for outputting a voltage, the coil is connected between the positive electrode terminal and a positive-side end of the load, and
the capacitor is connected between the positive-side end and the negative electrode terminal.

6. An ocean-floor optical cable comprising:
the power source circuit according to claim 1;
an optical fiber;
a plurality of optical amplifiers being connected to one another in series, each being configured to amplify an optical signal being propagated through the optical fiber on an input side and output the optical signal to the optical fiber on an output side; and
a laser module being the load included in the optical amplifier.

7. The power source circuit according to claim 2, wherein
the feedback circuit is a comparator configured to compare the reference voltage and the current detecting voltage with each other and output, to the DC/DC converter, the control signal indicating a comparison result.

8. The power source circuit according to claim 2, wherein
the feedback circuit is an operational amplifier configured to compare the reference voltage and the current detecting voltage with each other and output, to the DC/DC converter, the control signal indicating a comparison result.

9. The power source circuit according to claim 2, further comprising
a Schottky diode, a coil, and a capacitor that are used for stabilizing a voltage being output from the DC/DC converter, wherein
the Schottky diode is connected to a positive electrode terminal and a negative electrode terminal of the DC/DC converter for outputting a voltage,
the coil is connected between the positive electrode terminal and a positive-side end of the load, and
the capacitor is connected between the positive-side end and the negative electrode terminal.

10. An ocean-floor optical cable comprising:
the power source circuit according to claim 2;
an optical fiber;
a plurality of optical amplifiers being connected to one another in series, each being configured to amplify an optical signal being propagated through the optical fiber on an input side and output the optical signal to the optical fiber on an output side; and
a laser module being the load included in the optical amplifier.

\* \* \* \* \*